United States Patent
Lee et al.

(10) Patent No.: US 12,368,321 B2
(45) Date of Patent: Jul. 22, 2025

(54) POWER SUPPLY APPARATUS FOR SELF-POWERED DEVICE AND OPERATION METHOD THEREOF

(71) Applicants: SKAIChips Co., Ltd., Suwon-si (KR); Research & Business Foundation SUNGKYUNKWAN UNIVERSITY, Suwon-si (KR)

(72) Inventors: Kang Yoon Lee, Seoul (KR); Jong Wan Jo, Suwon-si (KR); Young Gun Pu, Suwon-si (KR); Byeong Gi Jang, Suwon-si (KR); Dong Soo Park, Suwon-si (KR); Joon Hong Park, Suwon-si (KR); Jae Bin Kim, Suwon-si (KR); Yun Gwan Kim, Suwon-si (KR)

(73) Assignees: SKAIChips Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 712 days.

(21) Appl. No.: 17/687,607

(22) Filed: Mar. 5, 2022

(65) Prior Publication Data
US 2023/0283106 A1    Sep. 7, 2023

(51) Int. Cl.
*H02J 7/00* (2006.01)
*H02J 7/34* (2006.01)
*H02J 50/00* (2016.01)

(52) U.S. Cl.
CPC ........ *H02J 50/001* (2020.01); *H02J 7/00712* (2020.01); *H02J 7/34* (2013.01); *H02J 2207/20* (2020.01)

(58) Field of Classification Search
CPC .................................. H02J 50/001; H02J 7/34
See application file for complete search history.

(56) References Cited

U.S. PATENT DOCUMENTS

2020/0052604 A1* 2/2020 Tayebi .................. H01L 31/042

OTHER PUBLICATIONS

Non-final Office Action mailed Sep. 22, 2022 from the Korean Patent Office for Korean Application No. 10-2020-0175646.
Final Office Action mailed Mar. 30, 2023 from the Korean Patent Office for Korean Application No. 10-2020-0175646.
Hao Li et al. 'Design and Experimental Evaluation on an Advanced Multisource Energy Harvesting System for Wireless Sensor Nodes', The Scientific World Journal, Jun. 16, 2014, pp. 1-13, vol. 2014, Hindawi Publishing Corporation.

* cited by examiner

*Primary Examiner* — Robert Grant
(74) *Attorney, Agent, or Firm* — Insight Law Group, PLLC; Seung Lee

(57) ABSTRACT

Provided is a power supply apparatus for self-powered device including a power module configured to supply first driving power, a sensor module configured to be operated by the first driving power, and an energy harvesting module configured to select energy power with a higher signal intensity from among energy power from energy sources and harvest energy using the selected energy power as second driving power.

19 Claims, 4 Drawing Sheets

POWER SUPPLY APPARATUS FOR SELF-POWERED DEVICE AND OPERATION METHOD THEREOF

BACKGROUND

1. Field

The present disclosure relates to a power supply apparatus for self-powered device and an operating method thereof, and more particularly, to a power supply apparatus for self-powered device capable of supplying power by performing energy harvesting with optimal efficiency according to energy power supplied from energy sources and an operating method thereof.

2. Description of Related Art

In recent years, it has become difficult for people to individually check whether people are wearing masks or show symptoms of infection on a train or bus in relation to novel diseases all over the world.

To check people, ultra-small and ultra-low-power sensors may be applied, and while batteries for supplying power to sensors should be developed in pace with the development of such sensors, the development speed of batteries is low due to technical limits.

Existing batteries are large, heavy, and have a finite lifetime and thus may be difficult to apply to ultra-small sensors, and batteries may be difficult to replace according to a position of a sensor. Energy harvesting technology is one method applicable to ultra-small and ultra-low-power sensors to perform self-charging or use energy in place of a battery.

In energy harvesting, the amount of energy harvested varies according to changes in a surrounding environment and thus harvesting energy using several energy sources other than one energy source is less sensitive to environmental changes.

Recently, research has been conducted on using energy harvesting to apply some of continuously supplied driving power to sensors for checking people.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure is directed to providing a power supply apparatus for self-powered device for supplying power by performing energy harvesting with optimal efficiency according to energy power supplied from energy sources, and an operating method thereof.

The present disclosure is also directed to providing a power supply apparatus for self-powered device for supplying power satisfying part of continuously supplied driving power to a sensor module configured to indirectly check human health conditions, and an operating method thereof.

Aspects of the present disclosure are not limited thereto and other aspects not mentioned here will be clearly understood by those of ordinary skill in the art from the following description.

In a general aspect, a power supply apparatus for self-powered device includes a power module configured to supply first driving power, a sensor module configured to be operated by the first driving power, and an energy harvesting module configured to select energy power with a higher signal intensity from among energy power supplied from energy sources and harvest energy using the selected energy power as second driving power.

The energy harvesting module may include a signal sensor configured to sense signal intensities of the energy power, a variable rectifier including a plurality of rectifiers and a plurality of switches between the plurality of rectifiers, a charging unit configured to be charged with direct-current (DC) power rectified by the variable rectifier, a power converter configured to supply the second driving power to the sensor module, the second driving power being obtained by converting discharge power discharged by the charging unit, and a controller configured to select the energy power from among the energy power, the signal intensity of which is sensed by the signal sensor, and control at least one of the plurality of rectifiers and at least one of the plurality of switches to be operated to output the DC power of a maximum power point (MPP) from the selected energy power according to a maximum power point tracking (MPPT) algorithm.

The number of the plurality of switches may be less than the number of the plurality of rectifiers.

The plurality of rectifiers and the plurality of switches may be coupled in a matrix.

The power supply apparatus for self-powered device may include a relay unit configured to supply the discharge power to the power converter under control of the controller.

The controller may control the relay unit to discharge the discharge power when the charging unit is charged to a first reference power level with the DC power.

The controller may set operational structures of the plurality of rectifiers and the plurality of switches on the basis of a type and signal intensity of the selected energy power, and control the variable rectifier according to the operational structures.

When the discharge power is supplied to the sensor module, the controller may control the discharge power to be blocked and the first driving power to be supplied when the DC power with which the charging unit is charged is discharged to a second reference power level lower than the first reference power level.

The power converter may be a boot converter.

In another general aspect, an operating method of a power supply apparatus for self-powered device includes selecting energy power with a higher signal intensity from among energy power from energy sources during supply of first driving power to a sensor module, setting operational structures of a plurality of rectifiers and a plurality of switches to output direct-current (DC) power of a maximum power point (MPP) from the selected energy power according to an MPPT algorithm, rectifying the selected energy power into DC power by operating at least one of the plurality of rectifiers and at least one of the plurality of switches according to the operational structures, charging a charging unit with the DC power and determining whether the DC power with which the charging unit is charged satisfies a first reference power level, when the DC power satisfies the first reference power level, discharging the charging unit to supply discharge power to a power converter, converting the discharge power to second driving power by a power converter, and blocking the supply of the first driving power to the sensor module and controlling the second driving power to be supplied.

Other features and aspects will be apparent from the following detailed description, drawings, and claims.

Figure 1:
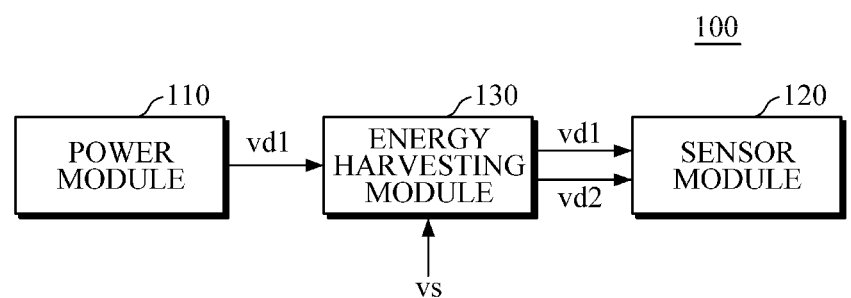
FIG. 1 is a control block diagram illustrating an example of a control configuration of a power supply apparatus for self-powered device according to the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Various changes may be made in the present disclosure and various embodiments may be implemented, and thus example embodiments are illustrated in the drawings and described in detail herein. However, it should be understood that the present disclosure is not limited to particular embodiments but includes all modifications, equivalents, and alternatives falling within the idea and scope of the present disclosure. In describing each drawing, similar reference numerals are used for similar elements.

Terms such as "first," "second," "A," "B," and the like may be used to describe various components, but the components should not be limited by these terms. The terms are only used to distinguish one component from another. For example, a first component may be referred to as a second component without departing from the scope of the present disclosure, and similarly, a second component may also be referred to as a first component. The term "and/or" includes a combination of a plurality of related items described therewith or any one of the plurality of related items.

When a component is referred to as being "coupled" or "connected" to another component, it should be understood that the component may be directly coupled to or connected to the other component or another component may be interposed therebetween. In contrast, when a component is referred to as being "directly coupled" or "directly connected" to another component, it should be understood that no component is interposed therebetween.

The terms used herein are only used to describe certain embodiments and are not intended to limit the present disclosure. As used herein, the singular expressions are intended to include plural forms as well, unless the context clearly dictates otherwise. It should be understood that the terms "comprise" and/or "comprising," when used herein, specify the presence of stated features, integers, steps, operations, elements, components, or combinations thereof, but do not preclude the presence or addition of one or more features, integers, steps, operations, elements, components, or combinations thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted with ideal or excessively formal meanings unless explicitly defined herein.

Hereinafter, embodiments of the present disclosure will be described in detail with reference to the accompanying drawings.

Figure 2:
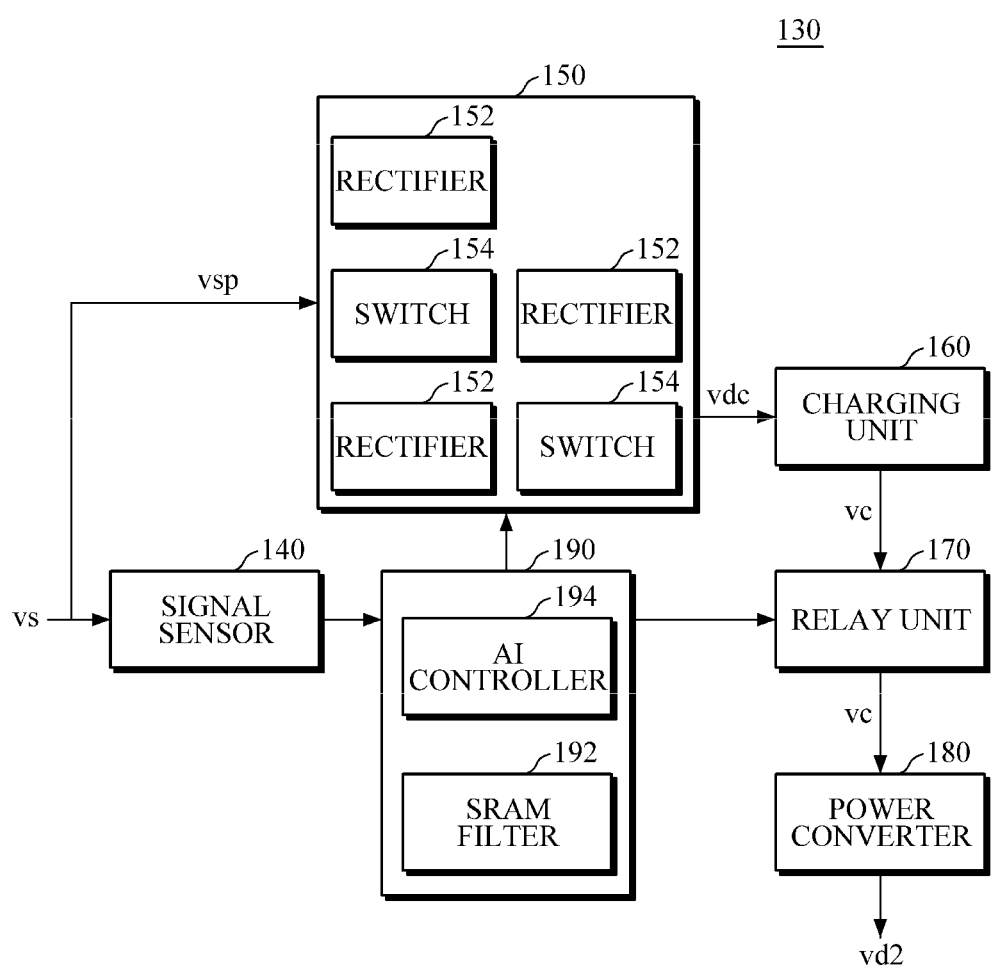
FIG. 2 is a control block diagram illustrating an example of a control configuration of an energy harvesting module of FIG. 1.

FIG. 1 is a control block diagram illustrating an example of a control configuration of a power supply apparatus for self-powered device according to the present disclosure. FIG. 2 is a control block diagram illustrating an example of a control configuration of an energy harvesting module of FIG. 1.

Referring to FIGS. 1 and 2, a power supply apparatus for self-powered device 100 may include a power module 110, a sensor module 120, and an energy harvesting module 130.

The power module 110 may supply first driving power vd1 to the sensor module 120.

Although it is described in this embodiment that the power module 110 is included in the power supply apparatus for self-powered device 100, embodiments of the present disclosure are not limited thereto.

For example, when the sensor module 120 is installed in a vehicle or a train, the power module 110 may be a vehicle battery or a train battery.

The sensor module 120 may be operated by the first driving power vd1.

The sensor module 120 may be an image sensor or a temperature sensor and may be operated by the first driving power vd1 to check people.

Alternatively, the sensor module 120 may include a controller and a communicator to transmit values obtained by checking people with the image sensor and the temperature sensor to another device, but embodiments of the present disclosure are not limited thereto.

Here, referring to FIG. 2, the energy harvesting module 130 may include a signal sensor 140, a variable rectifier 150, a charging unit 160, a relay unit 170, a power converter 180, and a controller 190.

The signal sensor 140 may sense signal intensities of energy power vs supplied from energy sources.

In an embodiment, the energy sources may include at least one of radio-frequency (RF) energy, solar energy, thermal energy, and piezoelectric energy.

In an embodiment, the signal sensor 140 may individually sense the energy power vs, which is supplied from energy sources, in a quantity corresponding to the number of energy sources.

The signal sensor 140 may output the energy power vs to the controller 190 when the signal intensities thereof are equal to or greater than a predetermined reference level.

The variable rectifier 150 may include a plurality of rectifiers 15 and a plurality of switches 154.

Here, the number of the plurality of switches 154 may be less than that of the plurality of rectifiers 152 and the plurality of switches 154 and the plurality of rectifiers 152 may be formed in a matrix, but embodiments are not limited thereto.

The plurality of switches 154 and the plurality of rectifiers 152 may be operated under control of the controller 190, and operational structures thereof may be different from each other.

The operational structures may be different in terms of a circuit configuration under control of the controller 190.

Here, the plurality of rectifiers 152 and the plurality of switches 154 may output direct-current (DC) power vdc obtained by rectifying the energy power vs.

The charging unit 160 may be charged with the DC power vdc output from the variable rectifier 150, and discharge the charged DC power vdc as discharge power vc under control of the controller 190.

Here, the charging unit 160 may include a plurality of capacitors but is not limited thereto.

The relay unit 170 may be positioned between the charging unit 160 and the power converter 170.

The relay unit 170 may be formed as a switch device, and supply the discharge power vc discharged by the charging unit 160 to the power converter 170 or block the supply of the discharge power vc.

When the discharge power vc is supplied, the power converter 180 may convert the discharge power vc into second driving power vd2.

In this case, when the supply of the first driving power vd1 to the sensor module 110 is blocked under control of the controller 190, the power converter 180 may supply the second driving power vd2 to the sensor module 110.

The controller 190 may select energy power vsp with a higher signal intensity from among the energy power vs supplied from the signal sensor 140.

The controller 190 may include a static random access memory (SRAM) filter 192 and an AI controller 194.

The SRAM filter 192 may generate and output a control bit on the basis of weights generated according to the signal intensities of the energy power vs.

For example, when the energy power vs includes radio-frequency (RF) energy, solar energy, and piezoelectric energy, the SRAM filter 192 may generate and output a control bit on the basis of a first weight generated according to a signal intensity of the RF energy, a second weight generated according to a signal intensity of the solar energy, and a third weight generated according to a signal intensity of the piezoelectric energy.

In addition, the SRAM filter 192 may compare a result of learning performed before the input of the weights with the weights and generate the control bit according to a result of the comparing.

That is, as a result, the SRAM filter 192 may output a control bit for selecting the energy power vsp for increasing power conversion efficiency during power conversion of the power converter 180 by comparing the signal intensities of the energy power vs with each other or the result of learning.

Upon receiving the control bit from the SRAM filter 192, the AI controller 194 may use a maximum power point tracking (MPPT) algorithm to select the energy power vsp with the higher signal intensity from among the energy power vs.

When the energy power vsp is selected, the AI controller 194 may control the variable rectifier 150 to output DC power vdc of an MPP from the energy power vsp according to the MPPT algorithm.

That is, the AI controller 194 may set operational structures of the plurality of rectifiers 152 and the plurality of switches 154 according to a type and signal intensity of the energy power vsp, and control the plurality of rectifiers 152 and the plurality of switches 154 to be operated according to the operational structures.

For example, the AI controller 194 may set the operational structures differently when the type of the energy power vsp is the same as those of the other electric power vs and when the signal intensity thereof is different from those of the other energy power vs.

Alternatively, the AI controller 194 may also set the operational structures differently when the type of the energy power vsp is not the same as those of the other electric power vs and when the signal intensity thereof is the same as those of the other energy power vs.

When the variable rectifier 150 outputs the DC power vdc obtained by rectifying the energy power vsp, the AI controller 194 may sense a charging level of the charging unit 160.

In this case, when the charging level of the charging unit 160 reaches a first reference power level, the AI controller 194 may control the relay unit 170 to discharge the discharge power vc from the charging unit 160.

Thereafter, when the charging unit 160 discharges the discharge power vc, the AI controller 194 may control the relay unit 170 to block the discharge power vc when the charging level of the charging unit 160 reaches a second reference power level lower than the first reference power level.

As described above, the AI controller 194 may control one of the first driving power vd1 and the second driving power vd2 to be supplied to the sensor module 110 when the discharge power vc is supplied or blocked.

Figure 3:
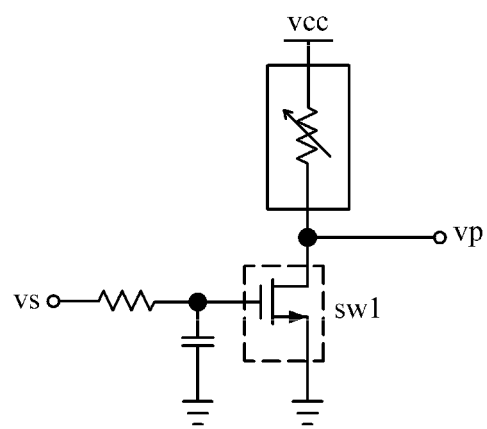
FIG. 3 is a circuit diagram of an example of a signal sensor of FIG. 2.

FIG. 3 is a circuit diagram of an example of the signal sensor 140 of FIG. 2.

Referring to FIG. 3, in the signal sensor 140, energy power vs may be input to a gate of a switch element sw1, driving power vcc representing a signal intensity may be input to a drain of the switch element sw1, and a source of the switch element sw1 may be connected to the ground.

In this case, the switch element sw1 may perform a switching operation according to signal intensities vp of the energy power vs and output the driving power vcc to correspond to the signal intensities vp of the energy power vs.

Here, the controller 190 described above with reference to FIG. 2 may select energy power vsp by comparing the signal intensities vp of the energy power vs with each other.

Figure 4:
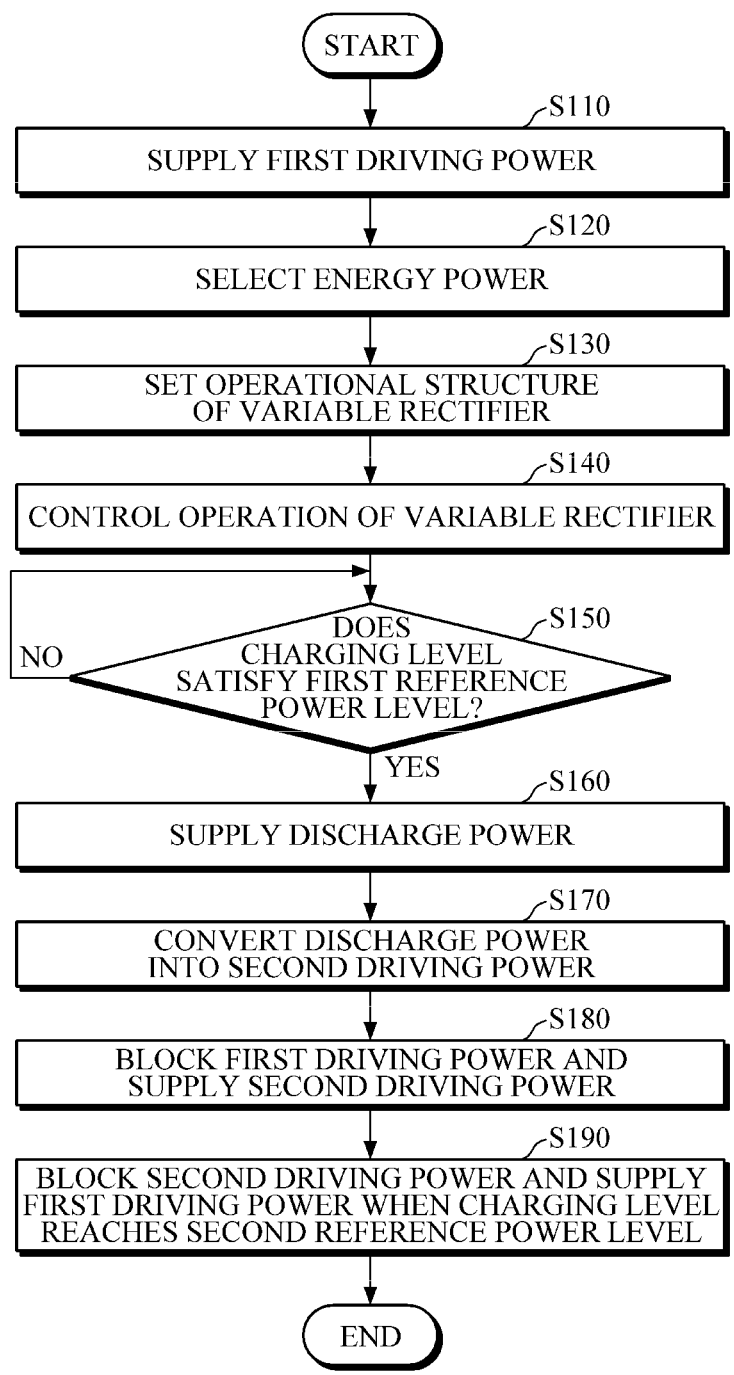
FIG. 4 is a flowchart of an example of an operating method of a power supply apparatus for self-powered device according to the present disclosure.

FIG. 4 is a flowchart of an example of an operating method of a power supply apparatus for self-powered device according to the present disclosure.

Referring to FIG. 4, the controller 190 of the power supply apparatus for self-powered device 100 may control the power module 110 to supply first driving power vdc1 to the sensor module 120 (S110).

The controller 190 may select energy power vsp with a higher signal intensity from among energy power vs supplied from energy sources (S120).

That is, the controller 190 may select the energy power vsp with the higher signal intensity from among the energy power vs supplied from the signal sensor 140.

The controller 190 may compare signal intensities of the energy power vs with each other to select the energy power vsp with the higher signal intensity, so that power conversion efficiency may be increased during power conversion of the power converter 180.

The controller 190 may set operational structures of the plurality of rectifiers 152 and the plurality of switches 154 to output DC power of an MPP from the selected energy power vsp according to the MPPT algorithm (S130).

That is, the controller 190 may set the operational structures of the plurality of rectifiers 152 and the plurality of switches 154 according to a type and signal intensity of the energy power vsp and control the plurality of rectifiers 152 and the plurality of switches 154 to be operated according to the operational structures.

The controller 190 may operate at least one of the plurality of rectifiers 152 and at least one of the plurality of switches 154 according to the operational structures to rectify the energy power VSP into DC power vdc (S140).

The controller 190 may charge the charging unit 170 with the DC power vdc and determine whether a charging level of the charging unit 160 satisfies a first reference power level (S150), and may discharge the charging unit 160 to supply discharge power vc to the power converter 170 when the charging level satisfies the first reference power level (S160).

That is, the controller 190 may output the DC power vdc obtained by rectifying the energy power vsp by the variable rectifier 150 and sense the charging level of the charging unit 160.

In this case, when the charging level of the charging unit 160 reaches the first reference power level, the controller 190 may control the relay unit 170 to discharge the discharge power vc from the charging unit 160 and supply the discharge power vc to the power converter 170.

The power converter 170 may convert the discharge power vc into second driving power vd2 (S170), and the controller 190 may block the supply of first driving power vd1 to the sensor module 120 and control the second driving power vd2 to be supplied (S180).

The controller 190 may block the relay unit 170 when the charging level of the charging unit 160 reaches a set second reference power level, and control the first driving power vd1 to be supplied to the sensor module 120 (S190).

In a power supply apparatus for self-powered device and an operating method thereof according to the present disclosure, driving power can be supplied to a sensor module capable of indirectly checking people by generating the driving power by harvesting energy power supplied from energy sources to reduce consumption of the driving power that is continuously supplied.

In the power supply apparatus for self-powered device and the operating method thereof according to the present disclosure, energy can be harvested by changing an operational structure of a variable rectifier, which includes a plurality of rectifiers and a plurality of switches, according to a type and signal intensity of energy power, thereby increasing efficiency of energy harvesting.

Effects of the present disclosure are not limited thereto and may include various other effects that are within the scope obvious to those of ordinary skill in the art from the above description.

The present disclosure has been described above with respect to embodiments. It will be understood by those of ordinary skill in the technical field to which the present disclosure pertains that the present disclosure may be implemented in a modified form without departing from the essential characteristics of the present disclosure. Therefore, the embodiments set forth herein should be considered in a descriptive sense only and not for purposes of limitation. The scope of the present disclosure is defined in the claims rather than the foregoing description, and all differences equivalent thereto should be interpreted as being included in the present disclosure.

What is claimed is:

1. A power supply apparatus for self-powered device comprising:
    a power module configured to supply first driving power;
    a sensor module configured to be operated by the first driving power; and
    an energy harvesting module configured to select energy power with a higher signal intensity from among energy power supplied from energy sources and harvest energy using the selected energy power as second driving power,
    wherein the energy harvesting module comprises:
        a signal sensor configured to sense signal intensities of the energy power;
        a variable rectifier including a plurality of rectifiers and a plurality of switches between the plurality of rectifiers;
        a charging unit configured to be charged with direct-current (DC) power rectified by the variable rectifier;
        a power converter configured to supply the second driving power to the sensor module, the second driving power being obtained by converting discharge power discharged by the charging unit; and
        a controller configured to select the energy power from among the energy power, the signal intensities of which are sensed by the signal sensor, and control at least one of the plurality of rectifiers and at least one of the plurality of switches to be operated to output the DC power of a maximum power point (MPP) from the selected energy power according to a maximum power point tracking (MPPT) algorithm.

2. The power supply apparatus for self-powered device of claim 1, wherein the number of the plurality of switches is less than the number of the plurality of rectifiers.

3. The power supply apparatus for self-powered device of claim 1, wherein the plurality of rectifiers and the plurality of switches are coupled in a matrix.

4. The power supply apparatus for self-powered device of claim 1, further comprising a relay unit configured to supply the discharge power to the power converter under control of the controller.

5. The power supply apparatus for self-powered device of claim 4, wherein the controller controls the relay unit to discharge the discharge power when the charging unit is charged to a first reference power level with the DC power.

6. The power supply apparatus for self-powered device of claim 1, wherein the controller sets operational structures of the plurality of rectifiers and the plurality of switches on the basis of a type and signal intensity of the selected energy power, and controls the variable rectifier according to the operational structures.

7. The power supply apparatus for self-powered device of claim 1, wherein, when the discharge power is supplied to the sensor module, the controller controls the discharge power to be blocked and the first driving power to be supplied when the DC power with which the charging unit is charged is discharged to a second reference power level lower than the first reference power level.

8. The power supply apparatus for self-powered device of claim 1, wherein the power converter comprises a boot converter.

9. An operating method of a self-powered supply device, comprising:
    selecting energy power with a higher signal intensity from among energy power supplied from energy sources during supply of first driving power to a sensor module;
    setting operational structures of a plurality of rectifiers and a plurality of switches to output direct-current (DC) power of a maximum power point (MPP) from the selected energy power according to a maximum power point tracking (MPPT) algorithm;
    rectifying the selected energy power into DC power by operating at least one of the plurality of rectifiers and at least one of the plurality of switches according to the operational structures;
    charging a charging unit with the DC power and determining whether the DC power with which the charging unit is charged satisfies a first reference power level;

when the DC power satisfies the first reference power level, discharging the charging unit to supply discharge power to a power converter;

converting the discharge power to second driving power by the power converter; and blocking the supply of the first driving power to the sensor module and controlling the second driving power to be supplied.

10. The operating method of claim 9, wherein the number of the plurality of switches is less than the number of the plurality of rectifiers.

11. The operating method of claim 9, wherein the plurality of rectifiers and the plurality of switches are coupled in a matrix.

12. The operating method of claim 9, wherein the discharging of the charging unit to supply the discharge power to the power converter is performed by a relay unit under control based on whether the DC power with which the charging unit is charged satisfies the first reference power level.

13. The operating method of claim 9, wherein the setting of operational structures of the plurality of rectifiers and the plurality of switches comprises:

determining a type and signal intensity of the selected energy power; and setting the operational structures of the plurality of rectifiers and the plurality of switches on the basis of the determined type and signal intensity of the selected energy power.

14. The operating method of claim 9, further comprising:

monitoring a charge level of the charging unit during supply of the second driving power;

determining whether the DC power with which the charging unit is charged is discharged to a second reference power level lower than the first reference power level; and when the DC power is discharged to the second reference power level, blocking the discharge power and resuming the supply of the first driving power to the sensor module.

15. The operating method of claim 9, wherein the power converter comprises a boot converter.

16. The operating method of claim 9, wherein the maximum power point tracking (MPPT) algorithm comprises:

initially setting the operational structures of the plurality of rectifiers and the plurality of switches based on a predetermined configuration;

measuring an output power of the selected energy power;

iteratively adjusting the operational structures;

measuring the output power after each adjustment; and determining final operational structures that maximize the output power.

17. A self-powered supply device comprising:

a power module configured to supply first driving power to a sensor module;

a signal sensor that measures signal intensities of energy power supplied from energy sources;

a variable rectifier comprising a plurality of rectifiers and a plurality of switches;

a charging unit connected to the variable rectifier;

a power converter connected to the charging unit and the sensor module;

a relay unit connected between the charging unit and the power converter;

a memory storing instructions; and a processor that executes the instructions to:

select energy power with a higher signal intensity from among the energy power supplied from the energy sources based on the measured signal intensities;

set operational structures of the plurality of rectifiers and the plurality of switches to obtain direct-current (DC) power at a maximum power point (MPP) from the selected energy power according to a maximum power point tracking (MPPT) algorithm;

control the variable rectifier to rectify the selected energy power into DC power according to the set operational structures;

monitor a charge level of the charging unit;

determine whether the charge level of the charging unit satisfies a first reference power level;

activate the relay unit to discharge the charging unit to supply discharge power to the power converter when the charge level satisfies the first reference power level;

control the power converter to convert the discharge power to second driving power for the sensor module; and disable the supply of the first driving power to the sensor module when the second driving power is supplied to the sensor module.

18. The self-powered supply device of claim 17, wherein the relay unit is configured to selectively supply the discharge power to the power converter based on a charging level of the charging unit.

19. The self-powered supply device of claim 17, wherein the plurality of rectifiers and the plurality of switches are coupled in a matrix.

* * * * *